July 13, 1954 J. T. BECK 2,683,839

ELECTRIC CIRCUIT COMPONENT AND METHOD OF PREPARING SAME

Filed Jan. 12, 1950 2 Sheets-Sheet 1

INVENTOR.
JOHN T. BECK
BY Paul, Moore & Dugger
ATTORNEYS

INVENTOR.
JOHN T. BECK
BY
ATTORNEYS

Patented July 13, 1954

2,683,839

UNITED STATES PATENT OFFICE 2,683,839

ELECTRIC CIRCUIT COMPONENTS AND METHOD OF PREPARING SAME

John T. Beck, White Bear Lake, Minn., assignor to Beck's Inc., St. Paul, Minn., a corporation of Minnesota Application January 12, 1950, Serial No. 138,246

14 Claims. (Cl. 317—101)

Figure 1:
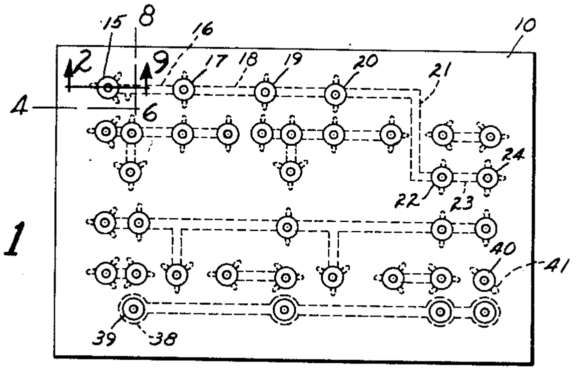

This invention relates to electric circuit components and methods of preparing same. In conventional electrical circuits the circuit is usually constructed by utilizing an insulating frame of fiber, slate, marble or the like or a metal chassis. To the insulating frame or metal chassis there are customarily attached the metallic and the like circuit elements which constitute the circuit being constructed. Where a metal chassis is used these circuit components are insulated from the chassis or otherwise supported or constructed so that the circuit element itself is insulated. The circuit elements include resistors, condensers, impedances, switch components, relays and the like and may be of varying form, including such diverse elements as vacuum tubes and other thermionic equipment. After the various elements are mounted mechanically upon the base of chassis, they are electrically connected by conductors of round or square section insulated from each other and from the chassis. Connections are made to the various circuit elements either by nuts and bolts, screws, or by soldering, depending upon the type of circuit and the loads that are carried. Such electrical circuits have the advantage that the circuit elements are separate and can be manufactured to close tolerances, and mounted and removed without disturbing other circuit elements. In addition, the electrical connectors between the elements can be of metal, such as copper selected for high conductivity. Circuits of this type are very old and are entirely satisfactory, except that the bulk and weight involved is considerable, particularly for complex circuits, and considerable time is required for assembly.

More recently there have been developed circuits in which some or all of the components are composed of members which are "printed" on the insulating background, usually of ceramic material. The material used for "printing" the circuit connectors and terminals is usually an "ink" containing finely divided or colloidal metals, which, after evaporation of the solvent forms a line or mark which is of conductive character. However, even in the best of such printed circuits such conductors have relatively high resistance as compared to actual copper conductors and therefore the resistance of such "printed" conductors is of disadvantage in that it upsets the circuit design. Furthermore, the amount of metal that can be deposited as an "ink" by printing is relatively minute, and in any event it is thin and is the surface of the base upon which the printing is carried out and is relatively fragile. The advantage of such printed circuits is their light weight and easy duplication, but they have been limited to such installations as require only minute currents. In addition, the assembly of complex circuits such as thermionic circuits is usually by soldering methods. When utilizing printed circuit components and an attempt is made to solder onto the printed circuit connectors the leads of external elements, difficulty is encountered due to the fact that the "printed terminals" and other "printed connectors" tend to lift from the base upon which they are printed during the soldering operation and it has not been possible satisfactorily and in production to solder such connections by the dip method in which a plurality of soldered connections are made simultaneously for an entire circuit by dipping the component, with the wires mechanically in place thereon, into a soldering bath. Hence, one of the frequent tests utilized in estimating the adaptability of a printed circuit is to immerse the insulating element, with the printed circuit thereon, into a bath of molten solder as in dip soldering and then observe the results. Any peeling or dislodgment of the printed on terminals or connector portions is an indication of the unsatisfactory character of such components. Furthermore, where ceramic bases have been used for the printed components, it is relatively difficult to provide holes therethrough for the insertion of lead wires to be soldered to the printed on terminals, and in any event the production of holes in a ceramic base cannot be made in commercial production except at the outset of manufacture of said ceramic base, which imposes a distinct limitation upon manufacturing operations.

Likewise, the effect of humidity and weathering on prior circuit components is most pronounced and printed circuits heretofore constructed have not been able to withstand such weathering, particularly in extremely moist or humid climates.

It is an object of the present invention to provide an improved circuit capable of being easily manufactured in mass production and at low cost.

It is a further object of the invention to provide an improved circuit component and methods of producing the same, wherein the circuit components are capable of being produced in either large or small size, even as small as the smallest printed circuits, or of large carrying capacity, depending upon the load, and capable of being connected by the dip soldering method, of resisting weathering and moisture and deterioration due to the elements.

It is a further object of the invention to provide circuit components and processes of preparing the same wherein only the terminals of the circuit are exposed for connection thereto of external circuit components, such as resistors, condensers, impedances, thermionic tubes, switches and the like, by the dip or individual or other soldering methods, the connector leads in the circuit being entirely embedded within an insulating body which is capable of resisting the effect of soldering and the deteriorating effects of moisture and the elements.

It is a further object of the invention to provide an improved circuit component wherein the terminal, to which soldered connections may be made by the dip soldering method, are solidly attached to the base on which they are formed and the intervening conductors, where used, are completely embedded.

Other and further objects of the invention are those inherent in the apparatus herein illustrated, described and claimed.

Figure 3:
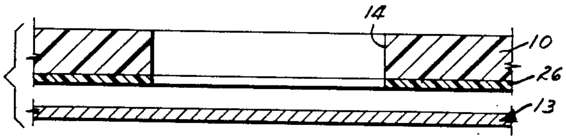
Figure 4:
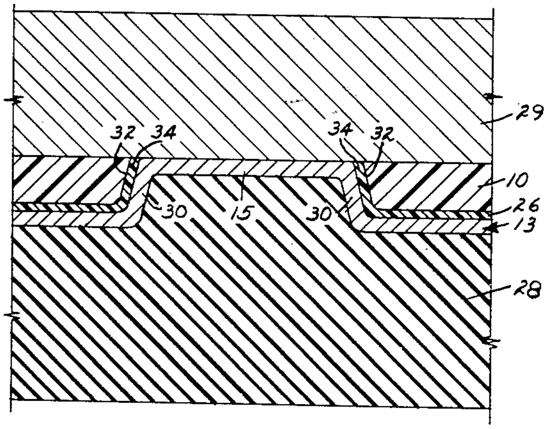
Figure 5:
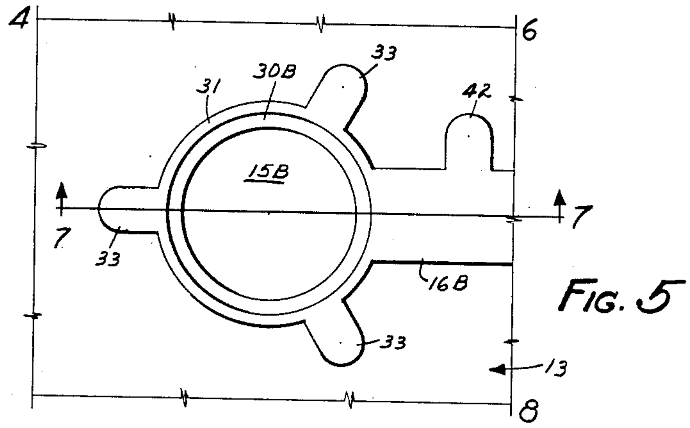
Figure 7:
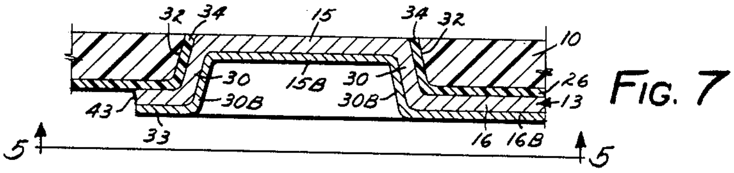
Figure 8:
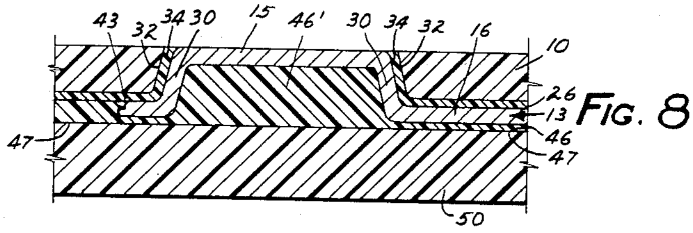
Figure 9:
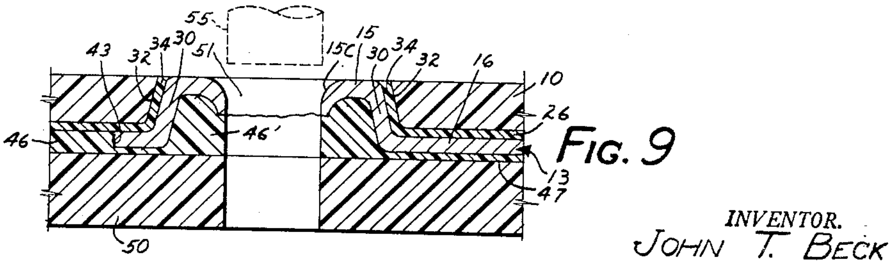

The invention is illustrated with reference to the drawings in which corresponding numerals indicate the same parts, and in which:

Figure 1 is a plan view of an illustrative circuit component, including terminals, intervening connectors, and base, made in accordance with the present invention;

Figures 2 through 9 are fragmentary and much enlarged views and represent successive stages in the manufacture of that small portion of the circuit shown in Figure 1 enclosed in the corner lines 4—6 and 6—8. In the group of Figures 2 through 9, all except Figure 5 are vertical sectional views of successive stages of manufacture of that portion of Figure 1 viewed in the direction of arrows 2—9, it being understood that the finished sectional view is shown in Figure 9 and that Figures 2, 3, 4, 6, 7 and 8 represent successive stages of manufacture leading to the finished device of Figure 9. Figure 5 is a view from the underneath side, taken in the direction of arrows 5—5 of Figure 7, Figure 7 in turn being a sectional view taken on the line 7—7 of Figure 5.

In carrying out the invention, for the preparation of novel circuit components of the invention by the method thereof, there is first prepared a sheet of appropriate outside dimensions and composed of electrically insulating plastic or resinous material capable of being set into its final form by pressure and heat. Such plastic sheet illustrated by the sheet 10 of Figure 2 can be composed of a wide variety of synthetic materials. Either cold setting or heat setting resins may be used. Exemplary resins suitable for such purposes include the phenol-formaldehyde, phenol-furfurol, furan, urea-formaldehyde, melamine, vinyl, polystyrene, polyethylene, methyl methacrylite and nylon resins. Suitable fillers, such as glass fiber, mica, earths, wood flour and the like may be used. With the resinous material there may be optionally included fillers or reinforcing material. Thus, fillers, such as mica, wood flour and the like may be used, or the sheet may be reinforced with woven or stranded material. Cloth that is woven from glass fiber and impregnated with thermosetting resinous material serves admirably for the purposes of the present invention. The types of resins which may be utilized are varied in accordance with the particular service for which the circuit component is ultimately intended to be used. Thus, where climatic conditions require types of resins which are able to withstand extreme humidity, fungi, etc. resinous sheets resistant to these effects may be utilized, whereas for less severe service other types of resins can be used with equally good results. Likewise, for extremely high temperature service glass impregnated sheets, and utilizing temperature resistant thermosetting resins, such as the silicone resins, provide good results. Most synthetic sheets are sufficiently resistant to temperatures of molten solder so as not to deteriorate significantly in the short period of heating required for soldering as subsequently described, even though deterioration might occur upon prolonged heating.

Figure 2:
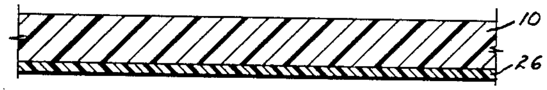

The resin sheet 10 can be of varying thickness from a few thousandths of an inch in thickness on up to much greater thicknesses, such as one-quarter inch or even thicker, for larger size circuits of greater area. Upon one face of the resin sheet 10, which is in its unpolymerized and unset and hence still in the plastic or semi-plastic condition, there is attached a sheet of equal dimensions, of conductive metal from which the terminal points, conductors, etc. are ultimately desired to be produced for construction of the circuit. The sheet, which is illustrated at 13 in Figure 3 is originally in planar condition. The sheet of metal 13 is temporarily bonded to the sheet 10 after the sheet 10 has been punched or drilled so as to provide a plurality of apertures therein, as shown at aperture 14, Figure 3, an aperture being provided for each terminal point in the completed circuit, ultimately desired to be produced. Thus, referring to Figure 1 the terminal generally designated 15 is desired to be produced and it is connected by means of a conductor at 16 to another terminal at 17 which is in turn connected by a continuation of the conductor at 18 to the terminal at 19 and so on through terminal 20, conductor 21, terminal 22, conductor 23, terminal 24. The remaining terminals and conductors of the circuit shown in Figure 1 need not be mentioned specifically since they are similar except for minor details as will be later pointed out. Hence, the sheet 10 is provided with a plurality of holes, wherever there is desired ultimately to have exposed a round or other shaped terminal point of the electrical circuit. Thus for the illustrated circuit of Figure 1, a hole is punched for each of the (circular) terminals. One such hole is shown at 14 in Figure 3. Then a sheet of metal 13, of Figure 3, having the same rectangular dimensions, or other dimensions so that it corresponds to the sheet 10, and an appropriate thickness for carrying the currents of the particular circuit being designed, is cut and is temporarily adhesively attached to the punched sheet 10.

Where the sheet 10 is not inherently adhesive in its uncured condition, or capable of being made temporarily adhesive by heating or otherwise, there is provided on the sheet 10 a layer of adhesive material which is illustrated at 26 in Figure 2. This adhesive material 26 is preferably also a synthetic resin having electrical insulating value in its final cured state. The resin 26 is preferably applied to the sheet 10 before the sheet 10 is cut to dimensional size for the circuit, and the resin 26 is permitted to dry or harden to a non-tacky condition so that it does not impair the easy and smooth handling of the sheet 10. The resinous layer 26 is preferably of a thermosetting resin type, and such that it can be rendered slightly adhesive for the temporary attachment of metal sheets 13 to plastic sheet 10, merely to hold them together during handling. The attachment of sheet 13 to the sheet 13 is made after the holes 14 and all other similar terminal holes have been punched. Suitable adhesive resinous materials of this character include the vinyl, phenolic, resorcinal, furan, urea, melamine, polystyrene, silicone, and polyacrylic ester resins.

In the next step of the process the composite composed of punch sheet 10 having the metal layer 13 adhesively attached thereto is placed in a press with a layer of "punching rubber" 28 against the metal 13 and with a stiff and non-resilient sheet 29 of steel or other hard supporting metal against the punched plastic sheet 10 as shown in Figure 4. Heavy pressure is then exerted on the assembly shown in Figure 4 between platens of a pressure press that are at the same time heated sufficiently to cause the resin sheet 10, and adhesive layer 26 to soften. The rubber 28 presses firmly against the portion 15 of the metal sheet 13 and causes it to be drawn into the shape shown in Figure 4 so that the portion 15 is flat against the supporting metal 29. When this occurs a wall is drawn out at 30 and the pressures exerted serve to cause the hole 14 to be slightly deformed at 32—32 so as to fit closely to the portion 30 of the sheet which is deformed to the shape shown in Figure 4 by the pressure. While pressure is being thus exerted and the unit is somewhat heated, the resin layer 26 flows so that it fits into the space between the edge 32—32 of the original hole 14 and the portion 30—30 of the metal as at 34—34. In this connection it should be recalled that the adhesive layer 26, where used, covers the entire surface of the sheet 10 and only a very small amount of such adhesive flows into any irregular spaces that might still exist when the pressure of the rubber sheet 28 causes the metal sheet 13 to be deformed into the shape 30—15—30 of Figure 4. The sections of adhesive at 32 in Figure 4 may be thicker or thinner than shown, and when no adhesive resin 26 is used, it is absent entirely.

When the pressing and partial curing operation of Figure 4 has been completed, the entire back portion metal side of the composite, composed of the sheets 10 and 13 pressed together and bonded, has depressions or dimples in the metal sheet side, these depressions or dimples being represented by the one shown in detail in Figure 4 at 30—15—30 which forms the terminal 15 of Figure 1. The metal sheet 13 is preferably deformed to an extent sufficient to "draw" the terminal completely through the thickness of the sheet 10, although such complete drawing is not essential to the formation of satisfactory circuit components in accordance with the present invention. Thus, where the sheet 10 is exceptionally thick the sheet 13 may be pressed (drawn) only part way through the thickness of the sheet 10, in which case the surface at 15 may be somewhat bulged, but this is not a disadvantage, rather than flat due to contact with plate 29. For purposes of the invention it is only necessary that the sheet 13 be formed to some extent by drawing it under pressure toward the ultimately exposed face of the sheet 10.

After the operation illustrated by Figure 4 is complete, there is applied to the metal surface 13 a coating of "stop-off" lacquer or paint sometimes known as "resist" paint or enamel suitable for protecting metal from etching in accordance with etching procedures. In the photolithographic arts, particularly, such stop-off or resist lacquers and paints are extensively used, and they are also used in the plating arts. The particular stop-off lacquer or paint that is used depends upon the type of etching used for removing portions of the metal layer 13 in a subsequent step and therefore the stop-off or resist lacquer or paint is suited to the particular etching procedures. Many such stop-off materials are available on the market.

The stop-off lacquer or paint is applied to the depressed portion of the metal of sheet 13 representing the terminal areas, including the wall portions 30—30, the under side of the flat portion 15 and preferably a slight marginal edge therearound. The lacquer thus applied is shown in Figure 5 where 15B illustrates the under side of the terminal 15 and the walls 30B illustrate the lacquer as applied to the wall 30. In addition, there is a very slight marginal portion as at 31. The marginal portion 31 may be wide or narrow as it serves as an anchorage for the terminal 15 ultimately produced and may be in the form of projecting tabs, as at 33—33 of Figure 5, or if desired the tabs may form a wide marginal flange as shown in dotted lines at 38 for the terminal 39 of Figure 1. While three marginal tabs are shown in the detail of Figure 5, it will be understood that any number of tabs may be provided, such as two tabs each for the terminals 17, 19 and 20 of Figure 1 and many of the other terminals, or the tabs may be small or large, the large tabs 41 being shown for terminal 40. Hence, the tabs 33 of Figure 5 are merely illustrative.

Certain of the terminals of the circuit may be required to be connected and for forming the connections it is only necessary to extend a line of stop-off or resist paint or lacquer from one terminal to another, as shown by the dotted lines in Figure 1, and shown in detail at 16B at Figure 5, which represent a portion of the connection between the terminals 15 and 17 of Figure 1. The stop-off lacquer at 16B Figure 5 serves ultimately to form the connection 16 and such connections may also be provided with tabs, as at 42 for enhancing the anchorage of the connecting lead 16. Ordinarily, however, it is unnecessary to provide anchorage tabs for the connections since they are ultimately embedded between the sheet 10 of plastic material and a cooperating sheet.

Figure 6:
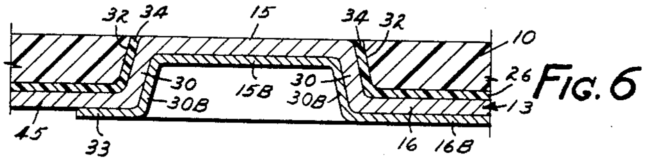

The stop-off lacquer or paint applied thus to form the terminals and connections in any anchorage or tabs or flanges that may be utilized is shown in section in Figure 6, wherein it will be noted that the remaining portion of the metal sheet 13 is thus exposed as at 45. The face 15 of the terminal is likewise protected from etching, and the composite, consisting of the sheet 10 and metal layer 13, with the stop-off lacquer or paint protecting certain portions of the layer 13, is then subjected to an etching procedure for the particular metal 13 being used. Thus, where a copper sheet 13 is used, the etching procedure may consist of an iron chloride—iron sulfate bath, or electro-etching may be used. Many etching baths and procedures are well-known in the art, and it will be understood that the etching bath or procedure can be varied in accordance with the methods or the wishes of the operator, or to meet economic conditions and the particular metal being etched. The etching is continued until all the exposed portions of the metal sheet 13, such as the portion 45 of Figure 6, have been etched away thus leaving only the metal which is protected by the overlaying layer of stop-off lacquer or paint. A section through the etched composite is shown in Figure 7 in which the etched and somewhat rough edge is shown at 43. It will also be appreciated that Figure 7, when viewed in the direction of arrows 5—5, has the appearance shown in Figure 5, since the stop-off lacquer is still applied and the only difference is that the previously exposed unprotected layer of metal 13 is etched away in Figure 7, whereas it is exposed in Figure 6. The peripheral edges of terminal flanges, tabs and connections all are etched and slightly rough and hence plastic readily bonds to such edges.

The thus formed composite shown in Figure 7 is then treated so as to remove the stop-off lacquer or paint. This can most conveniently be done by means of suitable solvents for the lacquer or paint. The solvent is applied to the stop-off lacquer and paint and the unit is lightly rubbed, more solvent being applied if necessary until all of the stop-off lacquer or paint is removed.

On the back or the under side of the unit thus treated, there is then applied another layer of adhesive material as at 46 in Figure 8. This adhesive material is preferably the same as that previously used at 26, although it may be a different heat setting resin. The adhesive 46 should be a thermosetting resin and it serves to produce a nearly level surface at the line 47 and to fill the recesses or dimples under the terminals, thus filling the recess at 46′ under the terminal 15. With the thermosetting resin adhesive thus applied at 46, there is then placed against the unit another plastic sheet as at 50 in Figure 8, and the entire unit is then placed between heated platens and pressed and heated until the resin of sheet 10 and the adhesive layers at 26 and 46 (where used), and the resinous sheet 50 are all bonded and cured together into a solid and resistant whole. By so doing the terminals, exemplified by the terminal 15 of Figure 8, and the connecting conductors, exemplified by the conductors 16 of Figure 8, are entirely embedded except for the surface of the terminals which is exposed through the apertures in the sheet 10.

The unit so constructed may be utilized in such condition by soldering to the thus exposed terminals the lead wires of external circuit elements, such as resistors, condensers, thermionic tubes, etc. However, for ease of soldering and assembly the circuit component is preferably further processed by drilling or punching each of the terminals and the underlying plastic so as to produce a hole partially or completely therethrough. The finished component thus treated is shown in section in Figure 9, wherein the terminal 15 has an aperture at 51 therethrough, said aperture continuing through the underlying adhesive 46 and the underlying sheet 50, it being understood that the adhesive 46 and sheet 50, as well as the adhesive 26 and sheet 10, all are cured into final set condition. For producing the aperture through the terminals one may utilize a drilling procedure or a punching operation and where a punching operation is utilized, this is preferably carried out by supporting the sheet 50 against the die and entering the punches against the terminal areas exposed through the sheet 10, thus, as shown by the punch at 55 in Figure 9. When the punching operation is carried out in this manner the effect of the punch 55 upon the terminals, as at 15 in Figure 9, is to cause the terminal surface to be drawn or curved slightly inwardly as shown at the curved surfaces 150 before the punch shears a hole through the center of the terminal and the underlying set plastic layers. By so punching there is produced additional anchorage of the terminal into the plastic 46 which fills the back of the terminal.

With a circuit component so constructed and especially with the terminals apertured, as shown in Figure 1, it is only necessary, for assembling the circuit components thereon, to bend the wire connections of the circuit components so as to enter through the holes of the appropriate terminals to which they are to be attached. All of the circuit components, such as conndensers, resistors, thermionic tubes, switches, impedances, transformers, batteries and the like, may thus be temporarily mechanically set in place by placing their lead wires through the cricuit component, the lead wires being preferably directed through the face 50 and terminated at about the surface of the terminals on the sheet 10. The natural resiliency of the lead wires will serve to hold light weight the circuit components temporarily in place and after all of the circuit components have been placed, the entire unit composed of the circuit components (such as Figure 1) with the circuit elements (resistors, condenser's, etc.) temporarily held hereon, is then dipped with the sheet 10 downwardly onto the surface of molten solder. The solder quickly adheres to the terminals and by capillary fills in around the connecting wires and the terminals and solders the wires and terminals together. The soldering of a large number of lead wires of the various circuit elements to their respective terminals may thus be effected by a single dip in much less time than it takes to describe it. Such soldering operation greatly reduces the time for the assembly of complex circuits and it is within the purview of the instant invention.

After the sheet 10 has been processed to the stage of Figure 7 and the sheet 50 then attached, but before final curing of the plastics, the entire unit can be curved and cured in curved condition so as to fit other than planar installations. The final unit can thus be molded to fit simple or compound curves. Such curving and curing can best be accomplished when the metal leads are relatively soft and flexible, for they are curved too in the process.

As many apparently widely different embodiments of this invention may be made without departing from the spirit and scope thereof, it is to be understood that I do not limit myself to the specific embodiments herein.

What I claim is:

1. The process of making circuit components which comprises forming apertures in a first sheet of electrically insulating hardenable plastic material, said apertures being formed throughout the areas where conductive portions of metal are desired ultimately to be exposed through said sheet, bonding to said plastic sheet a layer of electrically conductive metal and pressing said metal against the plastic sheet so as to force the metal of said sheet at least part way through the thickness of the sheet of plastic throughout the areas of said apertures, applying to the exposed face of said metal sheet opposite to the plastic a coating capable of protecting said metal from etching, said coating being applied to said metal sheet throughout the areas of said apertures and an area contiguous thereto and along lines connecting at least some of the areas at said apertures, etching away the unprotected metal and after removal of said protective coating from the residual un-etched parts of the plate, applying a coating layer of said plastic to the first sheet for sealing in said residual un-etched parts of metal.

2. The process of claim 1 further characterized in that the composite unit of plastic sheet and layer with metallic areas bonded therebetween and exposed through said sheet has apertures formed centrally through at least some of said exposed metallic areas and the underlying plastic sheet.

3. The process of claim 1 further characterized in that said protective coating is applied in areas contiguous with said holes and lines and protruding therefrom so as to protect the underlying metal to form protruding anchor tabs.

4. The process of making electric circuit components which comprises punching holes through a first sheet of hardenable plastic material at selected areas where metal parts of a circuit are ultimately to be exposed, placing against the punched sheet a sheet of electrically conductive metal capable of being drawn under pressure, squeezing said composite between a solid planar support applied to said plastic sheet and a flexible pressure pad applied to said metal sheet until the metal sheet is pressed through the holes of said plastic sheet and substantially into contact with the solid support, applying a stop-off protective coating capable of resisting etching to the exposed surface of the metal sheet opposite said plastic sheet throughout areas co-extensive with said holes plus at least some contiguous marginal area around at least a portion of the area of each hole and throughout areas connecting at least some of said areas, etching away the exposed metal so as to leave metal lands only in the areas protected by said stop-off coating, removing said coating, bonding a second sheet of thermosetting material to that side of the first sheet which has the metal lands thereon, said sheets being hardened and pressed together so as to conform to and flow around said lands and thereby embed them between the sheets.

5. The process of claim 4 further characterized in that the portions of metal exposed through the holes of the first plate are tinned for receiving solder.

6. The process of claim 4 further characterized in that the plastic sheets and metal are bonded by means of an adhesive resinous material.

7. The process of claim 4 further characterized in that apertures are formed through the portions of metal extending through the apertures of the first sheet of plastic.

8. The process of claim 4 further characterized in that after the circuit component is completed apertures are formed through those parts of the metal sheet that remain exposed through the apertures of the first sheet.

9. The process of claim 4 further characterized in that after the circuit component is completed, portions of metal exposed through apertures in the first sheet and the underlying second plastic sheet are punched by means of a punch and die, said punch being directed toward the metal and the second plastic sheet supported by a cooperating die, said metal being thereby punched and deformed slightly inwardly toward said second sheet and thereby additionally anchored.

10. A circuit component comprising two sheets of electrically insulating thermoset material bonded together along a meeting plane, one of said sheets having apertures therethrough, sheet metal lands at least co-extensive with said apertures and dished outwardly therethrough from said meeting plane toward the outer surface of said first sheet, each land having an anchoring flange around at least a part of the periphery thereof so as to hold it from being displaced through the aperture in which it is located, metal connections at said meeting plane between at least some of the lands, said connections being integral with the lands, the edges of said lands, flanges and connections being etched, said sheets being conformed to each other and to said lands and connections at the meeting plane, and thermo-set into a solid mass.

11. The circuit component of claim 10 further characterized in that a layer of thermoset resin adhesive is provided between the sheets of thermoset material and in and around the irregularities of said lands, flanges thereon and connections.

12. The circuit component of claim 10 further characterized in that said metal lands dished outwardly through said apertures are themselves being provided with holes therethrough for the insertion of external connection leads therethrough.

13. The circuit component of claim 12 further characterized in that the holes through the metal lands extend through not only the metal lands but the thermoset resin sheet coextensive therewith.

14. The circuit component of claim 10 further characterized in that the metal lands are tinned for receiving solder.

References Cited in the file of this patent

UNITED STATES PATENTS

| Number | Name | Date |
|---|---|---|
| 1,718,993 | Wermine | July 2, 1929 |
| 1,794,831 | Caruso | Mar. 3, 1931 |
| 1,939,130 | Mills | Dec. 12, 1933 |
| 2,288,735 | O'Connell | July 7, 1942 |
| 2,431,393 | Franklin | Nov. 25, 1947 |
| 2,433,384 | McLarn | Dec. 30, 1947 |
| 2,441,960 | Eisler | May 25, 1948 |
| 2,443,119 | Rubin | June 8, 1948 |
| 2,447,541 | Sabee | Aug. 24, 1948 |
| 2,474,988 | Sargrove | July 5, 1949 |

FOREIGN PATENTS

| Number | Country | Date |
|---|---|---|
| 19,919 | Great Britain | Nov. 5, 1892 |
| 331,991 | Great Britain | July 17, 1930 |
| 602,492 | Great Britain | May 27, 1948 |
| 596,830 | Germany | Apr. 26, 1934 |

OTHER REFERENCES

New Advances in Printed Circuits, U. S. Dept. of Commerce, Nat. Bureau of St'ds. Mis. Pub. 192.